Figure 1:
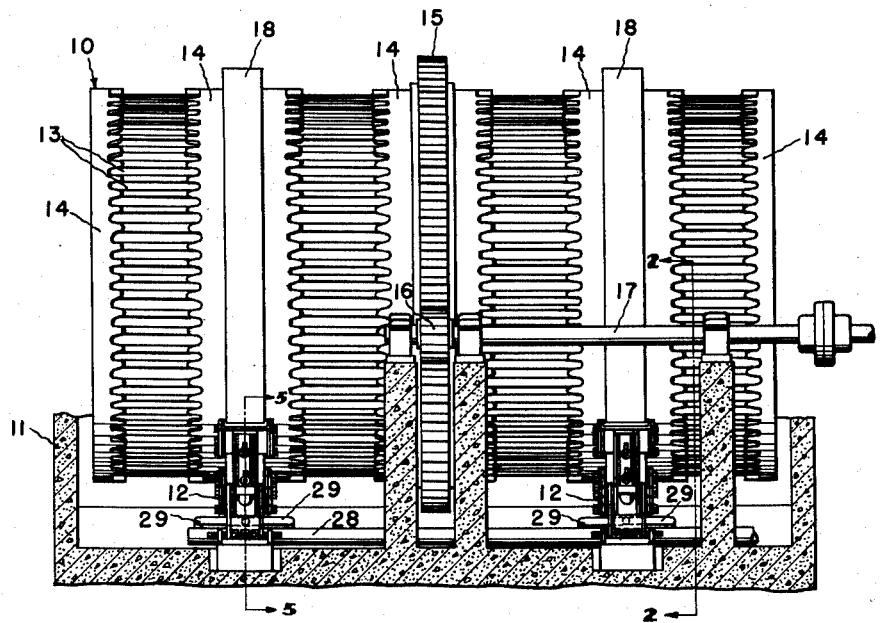

March 3, 1953     G. M. DICK     2,630,153
HYDRAULIC SUPPORT FOR LOG DEBARKING DRUM
Filed March 11, 1952     2 SHEETS—SHEET 1

INVENTOR
GEORGE M. DICK
BY
HIS ATTORNEY

March 3, 1953 G. M. DICK 2,630,153
HYDRAULIC SUPPORT FOR LOG DEBARKING DRUM
Filed March 11, 1952 2 SHEETS—SHEET 2

INVENTOR
GEORGE M. DICK
BY
HIS ATTORNEY

Patented Mar. 3, 1953

2,630,153

UNITED STATES PATENT OFFICE 2,630,153

HYDRAULIC SUPPORT FOR LOG DEBARKING DRUM

George M. Dick, Sherbrooke, Quebec, Canada, assignor to Ingersoll-Rand Company, New York, N. Y., a corporation of New Jersey Application March 11, 1952, Serial No. 275,985

6 Claims. (Cl. 144—208)

This invention relates to log debarking drum supports and more particularly to supports for a log debarking drum rotatably mounted in a tank containing a washing fluid.

A common method presently in use for removing bark from logs is to place the logs in a huge rotating drum. The logs tumbling about within the drum rub against each other and the inner surface of the drum thereby rubbing the bark free of the log. It was discovered that the speed and effectiveness with which the bark could be removed from logs in this manner is increased if the logs are wetted during the debarking operation. Accordingly, in some installations, water is sprayed into the drum, and in other installations, the drum is rotatably mounted within a tank containing a washing fluid, normally water.

The latter type of installation gave rise to the problem of finding a satisfactory bearing support for the drum. The ordinary trunnion support was unsatisfactory due to lubrication problems—dirt and water washed on to the bearing surfaces materially shortening the life of the bearing. To avoid this, a stationary bearing having a semi-circular bearing surface in sliding contact with the lower half of the drum was embedded in the wall of the tank. A groove was placed in the contact surface of the bearing and water, or other lubricant, admitted at one point in the groove for lubricating the bearing surface and preventing the entrance of dirt and other foreign materials thereinto.

This type of support, although having some advantages over the trunnion type support, gave rise to other difficulties. For example, it is prohibitively expensive to accurately construct a bearing of such size—the bearing surface had a length almost equal to one-half the circumference of the drum. Moreover, it is equally difficult to construct a tire or other bearing element for the drum which is perfectly round. Accordingly, the clearance between the surfaces on the drum tire and bearing varies along the length of the bearing surfaces; too great a clearance results in loss of pressure of the lubricant at those areas, and where the tire rubs directly against the bearing support, excessive bearing wear is caused and the friction losses increased.

It is the object of the present invention to eliminate the difficulties associated with this type of bearing. In the present invention the bearing shoes are pivoted in order to insure a proper fit between the bearing surfaces on the supports and the tire. To further insure a proper fit between the bearing surfaces on the support and the drum, the supports are made adjustable relative to the longitudinal axis of the drum so that adjustments may be made as required due to wear of the bearing or thermal expansion and contraction of the drum. The grooves in the bearing surfaces of the supports are arranged as a series of grooves spaced along the entire length of the bearing surface, and the pressure of the lubricant in each groove is controlled independently of the other grooves so as to insure the proper pressure throughout the entire length of the bearing. Further, the drum support is pivoted off center and in such manner as to create a wedge of lubricant between the bearing surfaces on the drum and the support.

It is accordingly one object of this invention to provide an improved bearing support for log debarking drums rotatable in a washing tank.

Another object of this invention is to insure proper lubrication of the bearing surfaces of the support throughout its entire length.

Another object of this invention is to maintain the proper clearance between the bearing surface along its entire length.

A further object is to maintain the pressure of the lubricant at its proper value throughout the entire length of the bearing surface.

Figure 2:
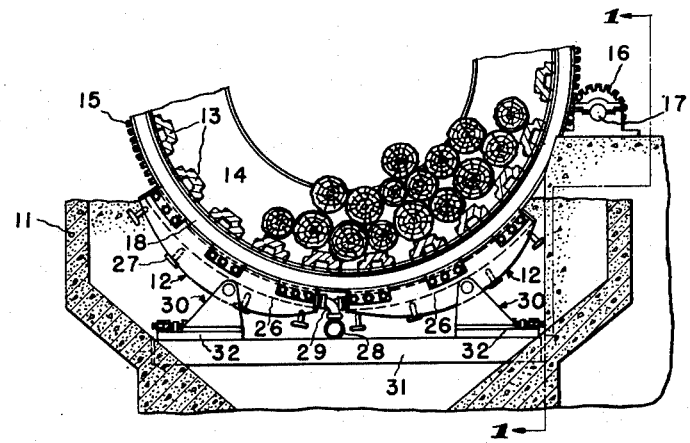
Figure 3:
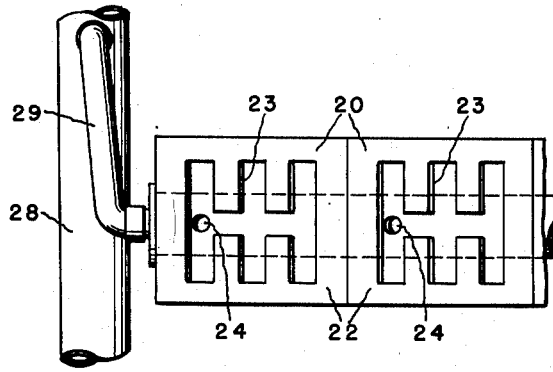
Figure 4:
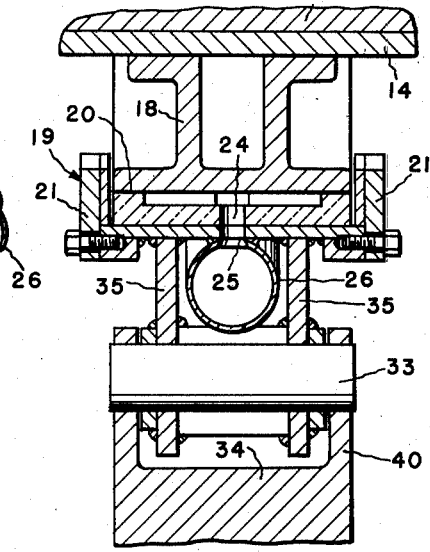
Figure 5:
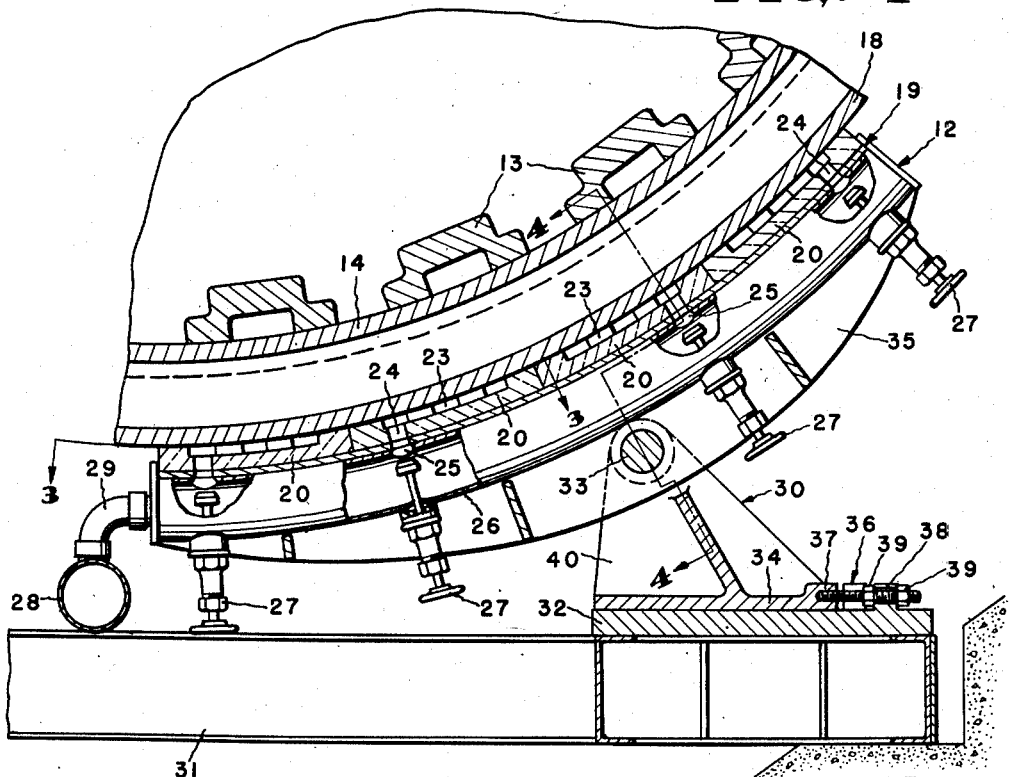

Other objects of this invention will become apparent from the following specification and drawings, in which, Figure 1 is a side view of a log debarking drum supported by drum supports constructed in accordance with the practice of this invention, Fig. 2 is a transverse view taken through Fig. 1 along lines 2—2 and looking in the direction of the arrows, Fig. 3 is a view taken from Fig. 5 along the lines 3—3 looking in the direction of the arrows, and shows the bearing segments and the arrangement of the grooves therein, Fig. 4 is a transverse view taken through Fig. 5 along line 4—4 looking in the direction of the arrows, and Fig. 5 is a vertical elevation, partly in section as indicated by the line 5—5 in Fig. 1, of the improved drum support.

Referring to the drawings, Figure 1 shows a log debarking drum 10 mounted in operative position in a tank 11 on a preferred form of drum supporting shoe 12. For the purpose of illustration, the drum 10 is shown as comprising a plurality of longitudinally disposed staves 13 secured to hoops 14 spaced along the length of the staves. Rotation is imparted to the drum 10 by means of a girth gear 15 mounted on the central hoop 14 and engaging a driving gear 16 driven by a shaft 17 which, in turn, may be driven by any conventional prime mover (not shown). Mounted on the hoops 14 located at the opposite end portions of the tank 11 are tires 18 which ride in the drum supporting shoes 12 mounted at the bottom of the tank 11; a pair of shoes 12 is provided for each tire and located on the opposite sides of the drum 10.

Referring now in greater detail to the construction of the drum support (see Figs. 3, 4 and 5), the shoe 12 comprises an arcuate casing member 19 having a generally U shaped cross-sectional form for receiving therein rectangular bearing segments 20 having bearing surfaces 22 conforming to the circumference of the tire 18. The sides 21 of the casing 19 are of somewhat greater length than the thickness or depth of the bearing segments 20 so that the sides 21 overlap the sides of the tire 18 to provide thrust surfaces to maintain the tires 18 in the shoes 12.

Formed in the bearing surface 22 of the segments 20, generally made of a composition, is a plurality, or series, of grooves 23 positioned along the entire length of the shoe 12. In the form of the invention illustrated there is a groove provided in each of the segments 20. The purpose of forming the grooves 23 independent of each other is to enable independent control of the pressure of the lubricant admitted to these grooves thereby assuring the proper pressure of lubricant along the entire length of the bearing surface of the drum support. Also, in the event of failure of one of the segments, it is merely necessary to reduce or cut off the supply of lubricant to that segment to permit the continued use of the shoe.

The grooves 23 are formed in the shape of a series of joined crosses thereby insuring that the lubricant will be conducted not only along the length of the bearing surface but also across its width. At one end of each groove 23 is an inlet opening 24 registering with openings 25 in a conduit 26 secured to and running along the back of the casing 19. The quantity and pressure of lubricant admitted into each groove 23 from the conduit 26 is controlled by manually operable valves 27 mounted on the conduit 26 and arranged to control the flow of lubricant through the opening 25; there being one valve 27 for each opening 25. A lubricant—normally water—is supplied to the conduit 26 from a water main 28 centrally located along the bottom of the tank 11 and connected to the conduits 26 by means of hoses 29. The hoses 29 are preferably flexible in order to permit free pivotal movement of the drum support and transverse adjustments of these supports. By virtue of this arrangement it is readily apparent that the pressure of lubricant in any groove 23 of a particular shoe segment may be controlled by merely adjusting the valve 27 associated therewith to obtain a desired pressure.

The casings 19 are supported by supports 30 mounted on an I-beam 31 lying transversely on the bottom of the tank 11. In the particular form of the invention shown, the supports 30, in cross-section, are of the general shape of an inverted T with the cross 34 of the T slidably mounted on a bearing plate 32 and the spaced legs 40 of the T being pivotally connected by means of a pin 33 to flanges 35 located in parallelism on the opposite sides of the conduit 26 and extending along and secured to the back of the casing 19.

Referring to Figure 2 it will be noted that the supports 30 are pivotally connected to the shoes 12 at a point forward, relative to the direction of rotation of the drum, of the mid points of the shoes. In other words, assuming counter-clockwise rotation of the drum, the left ends of the shoes 12 are the leading ends thereof and the pins 33 are located rearward, or to the right, of the mid point of the shoe 12. The purpose of this particular location of the pin 33 is to cause the shoe 12 to rock slightly on its pivot such that the clearance between the bearing surface 22 on the segments 20 and the bearing surface on the tires 18 is greater at the leading end of the shoe 12 than at the trailing end of the shoe 12. In other words, the clearance between these two surfaces assumes the general form of a wedge with the drum rotating in the direction of the narrow edge of the wedge. With this arrangement a wedge of lubricant is formed between the bearing surfaces and due to rotation of the drum there is a tendency to force the lubricant along the bearing surfaces thereby insuring adequate lubrication along the entire length of the bearing surface.

In order to permit adjustment of the drum shoe transversely of the drum, an adjusting device indicated, in general, by the numeral 36 is located between the support 30 and the bearing plate 32. As illustrated, the device 36 comprises a pair of bolts 37 threaded in the support 30 and extending through an abutment 38 on the bearing plate 32. Nuts 39 are threaded on the bolts 37 on the opposite sides of the abutment 38 such that loosening of one of the nuts 39 and tightening of the other nut slides the support 30 on the bearing plate to move the shoes 12 towards or away from the drum 10, depending on the direction of rotation of the nuts 39. This arrangement permits adjustment of the shoes due to wear of the bearing segments 20 or for any other reason requiring repositioning of the shoes relative to the drum. Clamps (not shown) of any conventional form may be provided at points along the cross 34 of the support 30 to hold the support 30 against shifting relative to the bearing plate 32.

While I have shown and described a specific form of my invention, it is to be understood that various changes and modifications may be made without departing from the spirit of the invention as set forth in the appended claims.

I claim:

1. In a log debarking unit, a tank for containing a washing fluid, a drum in the tank, means for rotating the drum, tires mounted on the drum, drum supporting shoes having bearing surfaces in sliding contact with said tires, and supports pivotally connected to said shoes at a point forward, relative to the direction of rotation of the drum, of the mid points of the shoes.

2. In a log debarking unit, a tank for containing a washing fluid, a drum in the tank, means for rotating the drum, tires mounted on the drum, drum supporting shoes having bearing surfaces in sliding contact with said tires, said shoes having grooves in the bearing surfaces to conduct a lubricant over the area of the bearing surfaces, a conduit for conveying liquid lubricant under pressure to said grooves, and supports pivotally connected to said shoes at a point forward, relative to the direction of rotation of the drum, of the mid points of the shoes.

3. In a log debarking unit, a tank for containing a washing fluid, a drum in the tank, means for rotating the drum, drum supporting shoes having bearing surfaces in sliding contact with said drum, said shoes having a series of grooves longitudinally spaced from each other along the length of each shoe to conduct a lubricant over the area of the bearing surfaces, a conduit for conveying liquid lubricant under pressure to said grooves, a valve for each groove to control the pressure of lubricant admitted to the groove with which the valve is associated, and supports for said shoes.

4. In a log debarking unit, a tank for containing a washing fluid, a drum in the tank, means for rotating the drum, drum supporting shoes having bearing surfaces in sliding contact with said drum, said shoes having a plurality of grooves longitudinally spaced from each other along the length of each shoe to conduct a lubricant over the area of the bearing surface, a conduit for conveying liquid lubricant under pressure to said grooves, a valve for each groove to control the pressure of lubricant admitted to the groove with which the valve is associated, and supports pivotally connected to said shoes at a point forward, relative to the direction of rotation of the drum, of the mid points of the shoes.

5. In a log debarking unit, a tank for containing a washing fluid, a drum in the tank, means for rotating the drum, tires mounted on the drum, drum supporting shoes having bearing surfaces in sliding contact with said tires, a mounting, supports slidable on said mounting and pivotally connected to said shoes to support the drum, and adjustable devices between said mounting and said supports to permit movement of said supports toward and away from said drum to adjust the position of the shoes relative to the drum.

6. In a log debarking unit, a tank for containing a washing fluid, a drum in the tank, means for rotating the drum, drum supporting shoes having bearing surfaces in sliding contact with said drum, said shoes having a plurality of grooves longitudinally spaced from each other along the length of each shoe to conduct a lubricant over the area of the bearing surface, a conduit for conveying liquid lubricant under pressure to said grooves, a valve for each groove to control the pressure of lubricant admitted to the groove with which the valve is associated, a mounting, supports slidable on said mounting and pivotally connected to said shoes to support the drum, and adjustable devices between said mounting and said supports to permit movement of said supports toward and away from said drum to adjust the position of the shoes relative to the drum.

GEORGE M. DICK.

REFERENCES CITED

The following references are of record in the file of this patent:

UNITED STATES PATENTS

| Number | Name | Date |
|---|---|---|
| 2,243,631 | Johansson et al. | May 27, 1941 |
| 2,428,967 | Gray | Oct. 14, 1947 |